Figure 4:
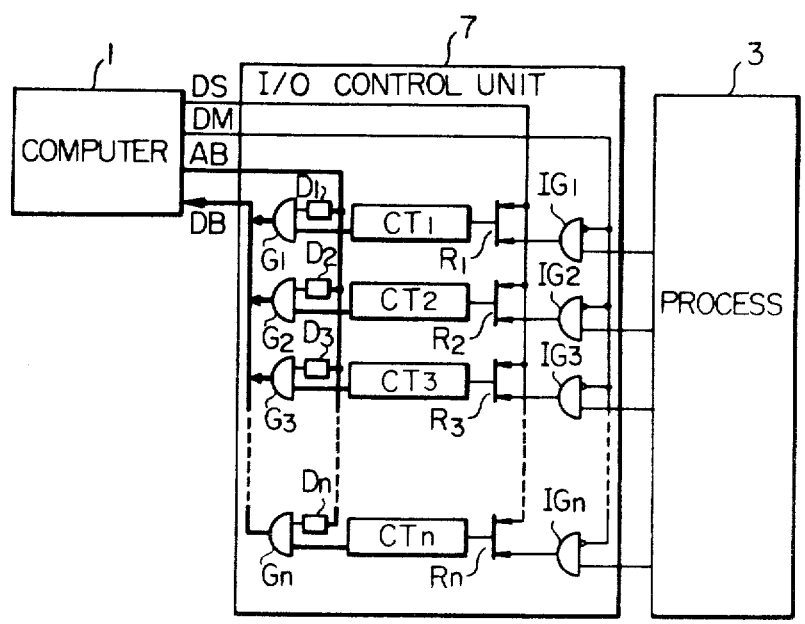

United States Patent [19]
Yoshitake et al.

[11] 3,710,350
[45] Jan. 9, 1973

[54] SYSTEM FOR DIAGNOSING AN INPUT-OUTPUT CONTROL UNIT

[75] Inventors: Norito Yoshitake, Kawasaki; Ryoji Imazeki, Yokohama, both of Japan

[73] Assignee: Fujitsu Limited, Kawasaki-shi, Japan

[22] Filed: June 18, 1971

[21] Appl. No.: 154,497

[30] Foreign Application Priority Data

June 22, 1970 Japan..............................45/54250

[52] U.S. Cl.................................................340/172.5
[51] Int. Cl.................................................G06f 11/00
[58] Field of Search....................................340/172.5

[56] References Cited

UNITED STATES PATENTS 3,510,843   5/1970   Bennett et al. ...................340/172.5
3,387,262   6/1968   Ottaway et al. ...................340/172.5
3,576,541   4/1971   Kwan et al.........................340/172.5

Primary Examiner—Gareth D. Shaw
Attorney—Maleson, Kimmelman & Ratner

[57] ABSTRACT

A system according to the present invention diagnoses an input-output control unit in the computer control system comprising a computer, the input-output control unit and a process. The diagnoses is carried out without separating the connections between the input-output control unit and the process and without using a simulator. Firstly, the diagnose mode signal is applied to the input-output control unit and separates this input-output control unit from the process. Secondly, the computer applies the diagnose signal to the input-output control unit and reads the output of the input-output control unit; thus the computer diagnoses the input-output control unit.

6 Claims, 4 Drawing Figures

PRIOR ART Fig. 1
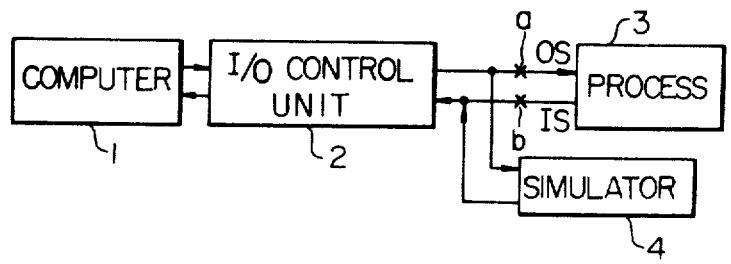
PRIOR ART Fig. 2
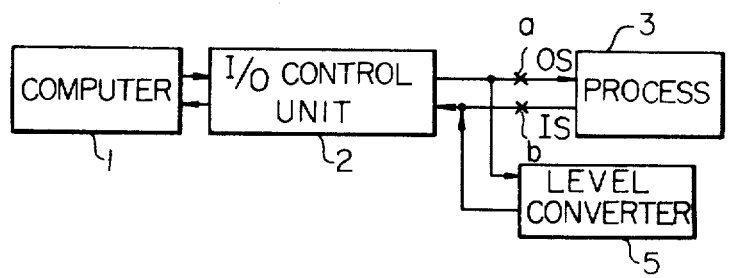
Fig. 3
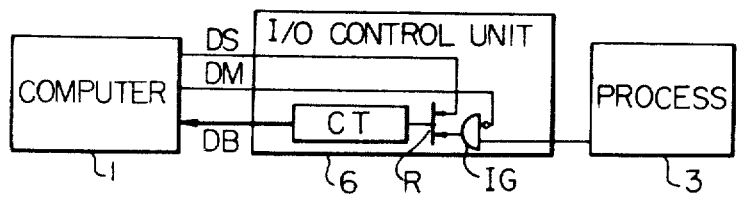

SYSTEM FOR DIAGNOSING AN INPUT-OUTPUT CONTROL UNIT

The present invention relates to a system for diagnosing an input-output control unit which is used to feed information into a computer or to extract information from a computer.

In recent years, the field of the application of the electronic computer has been increasingly enlarged, and it is now found in all fields, e.g. data collection, process control, business systems, etc. The electronic computer can perform every kind of function such as an operation function, a decision function, and a memory function. So, by the predetermined program and via the input-output control unit, the electronic computer carries out the necessary information processing of the received signals from the process, and sends the control signal to the above-mentioned process.

The input-output control unit receives every kind of process signals such as digital inputs, pulse inputs, interruption inputs, analogue inputs and send control signals in the form of digital outputs, pulse outputs, analogue outputs to the process. The input-output control unit is composed of every kind of register, counter, switching circuit, commutating circuit, analogue-to-digital converter, digital to analogue converter, etc., and stores or reads the information of the address designated by the electronic computer. When the object of the process is large scale the above-mentioned input-output control unit will include many kinds of input and output circuits.

We now define the technical terms used in the description of the present invention.

"The input-output control unit" — this unit controls the input information from the input devices of the computer, such as a data collection terminal, a machine to be controlled, a control device such as a chemical plant, a paper tape reader, etc., and the output information to the output devices of the computer, such as, a printer and a display unit, and this device is, in some cases, provided separately from the electronic computer, and in some cases, included in the electronic computer.

"Process" — this is a generic term applied to the above-mentioned input and output devices, such as the data collection terminal, the machine to be controlled etc., connected to the input-output control unit.

Conventional methods for diagnosing an input-output control unit in the case of an introduction test, a management problem, a periodical examination, etc., are carried out as described below. The first conventional method is carried out by separating the connections between the input-output control unit and the process, and connecting a simulator to said input-output control unit. The second conventional method is also carried out by separating the connections between the input-output control unit and the process, and connecting a level converter to said input-output control unit, converting a level of predetermined signal pattern of the computer to a constant level, and sending it back to said computer. However, in the above-mentioned two methods, the connections between the input-output control unit and the process must be separated at every occasion of the diagnosis and further a simulator or a level converter is always required. These are the main drawbacks of the conventional methods.

The object of the present invention is to overcome the above-mentioned drawbacks.

Another object of the present invention is to diagnose the input-output control unit by a diagnose mode of the computer, without separating the connections between the input-output control unit and the process.

A further object of the present invention is to diagnose the input-output controlling device without using a simulator, a level converter, etc.

A still further object of the present invention is to convert both the input and output circuits of the input-output control unit into the diagnose mode simultaneously and at the same time diagnose the input-output control unit.

Further features and advantages of the present invention will be apparent from the ensuing description with reference to the accompanying drawings to which, however, the scope of the invention is in no way limited.

FIG. 1 is a block diagram explaining a conventional method for diagnosing the input-output control unit, FIG. 2 is a block diagram explaining another conventional method for diagnosing the input-output control unit, FIG. 3 is a block diagram explaining the system for diagnosing the input-output control unit according to the present invention, FIG. 4 is a block diagram explaining another system for diagnosing the input-output control according to the present invention.

Referring FIG. 1, in the conventional system, the points a and b of the junction points between the input-output control unit 2 and the process 3 are separated, and the simulator 4 is connected to the input-output control unit 2. The simulator 4 generates the signal for diagnosing the input-output control unit 2. A computer 1 feeds a predetermined signal pattern to the simulator 4 via the input-output control unit 2, and in accordance with the above-mentioned signal pattern, the simulator 4 generates a predetermined signal pattern and feeds it to the computer 1 via the input-output control unit 2. The computer 1 receives the predetermined signal pattern generated on the simulator 4 and thereby the computer 1 diagnoses the input-output control unit 2.

Referring in FIG. 2, in another conventional system, the points a and b of the junction points between the input-output control unit 2 and the process 3 are also separated similarly as in FIG. 1, and in this case, a level converter 5 is connected to the input-output control unit 2. The level converter converts the level of the predetermined signal pattern from the computer 1 to the predetermined constant level and sends it back to the computer 1 via the input-output control device 2. The computer 1 receives the signal pattern which is converted to the constant level by the level converter 5, and thereby the computer 1 diagnoses the input-output control unit 2. In the above-mentioned two methods, the connections between the input-output control unit and the process must be separated at every occasion of the diagnosis and further a simulator or a level converter is always required.

Referring to FIG. 3, the system for diagnosing the input-output control unit 6 according to the present invention is shown in the case where the pulse counter CT is diagnosed. In this case, the input-output control unit 6 is further provided with an inhibit gate IG and an OR gate R. An information signal from the process 3 and the diagnose mode signal DM from the computer 1 are applied to the inhibit gate IG, and the output of the inhibit gate IG and the diagnose signal DS from the computer 1 are applied to the pulse counter CT to be diagnosed. The date bus DB is connected between the pulse counter CT and the computer 1, and the computer 1 reads the contents of the pulse counter CT by the read instruction.

In the case of normal operation, the diagnose mode signal DM is not applied to the input-output control unit 6, and the information signal from the process is applied via the inhibit gate IG and the OR gate R to the counter CT. In the case of diagnosing the input-output control unit 6, the diagnose mode signal DM is applied from the computer 1 or a test panel (not shown in the figure) to the inhibit gate IG. Therefore, the input-output control unit 6 is completely cut off from the process 3 by the inhibit gate IG. Next, the diagnose signal DS is feed from the computer 1 via the OR gate to the circuit to be diagnosed, in this case for example, the pulse counter CT. In this case, the diagnose signal DS is of suitable type for diagnosing the pulse counter CT, such as for example, a predetermined number of pulses. The computer 1 reads said number of pulses and via the data bus DB the contents of the pulse counter CT which is sent to the computer 1. When the contents of the pulse counter CT coincides with said number of pulses, the pulse counter is diagnosed as being in the state of normal operation.

The above-mentioned system is applied to the case where a number of pulse counters $CT_1$, $CT_2$, ... $CT_n$ are included in the input-output device 6. Referring to FIG. 4, in the case of diagnosing the input-output device 7, the diagnose mode signal DM is applied simultaneously to the inhibit circuits $IG_1 - IG_n$ connected respectively via the OR gates $R_1 - R_n$ to the pulse counter $CT_1 - CT_n$ to be diagnosed, and thereby the input-output device is completely cut off from the process 3. The diagnose signal is also applied simultaneously to the OR gates $R_1 - R_n$ connected respectively to the pulse counter $CT_1 - CT_n$. Further, the address information is applied via an address bus AB to the decoder $D_1 - D_n$, and outputs of the pulse counter $CT_1 - CT_n$ and outputs of the decoder $D_1 - D_n$ are respectively applied to the and gates $G_1 - G_n$. The outputs of the and gates $G_1 - G_n$ are sent via the data bus to the computer 1. In the above-mentioned circuit, the computer 1 can read the contents of the pulse counter selected by the above-mentioned address information. When different kinds of pulse counters are used in the input-output control unit 7, the diagnoses are carried out on every group kind by providing them with diagnose signals which correspond to each pulse counter.

The above-mentioned explanation is given in the case of diagnosing the pulse counters, and it will be understood that the same diagnosis is carried out for buffur memories, analogue-to-digital converters, digital-to-analogue converters, switching circuits, etc. Of course, the diagnosing signal should correspond with the element to be diagnosed.

What is claimed is:

1. System for diagnosing an input-output control unit in a computer control system including a computer, a process and an input-output control unit having an input-output circuit which is normally coupled between said computer and said process and transfers a signal from said computer to said process and vice versa, comprising an inhibit gate being provided between said process and said input-output circuit of said input-output control unit, the normal input of said inhibit gate being connected to said process and the inhibit input of said inhibit gate being connected to said computer, and an OR gate being inserted in series with the output of said inhibit element, one input of said OR gate being coupled to said computer, during the diagnosing operation a diagnose mode signal being applied from said computer to the inhibit gate whereby the information flow from said process to said input-output control unit is interrupted, a diagnose signal being applied from said computer to said input-output circuit via said OR gate, and said computer reading the output signal of said input-output circuit in response to said diagnose signal and diagnosing said input-output circuit.

2. System for diagnosing an input-output control unit in a computer system including a computer, a process and an input-output control unit having a plurality of input-output circuits which are connected between said computer and said process, said unit transferring signals from said computer to said process and from said process to said computer, comprising a plurality of inhibit gates coupled between said process and said input-output circuits of said input-output control unit, the normal inputs of said inhibit gates being connected to said process and the inhibit inputs of said inhibit gates being connected to said computer, OR gates respectively being inserted in series with said inhibit gates, one input of said OR gates being controllable by said computer; means for applying during the diagnosing operation a diagnose mode signal simultaneously to said inhibit gates from said computer whereby the information flow from said process to said input-output control unit is interrupted, means for applying a diagnose signal from said computer via said OR gates to said input-output circuits, AND gates with decoders being respectively coupled to said input-output circuits, means for applying address information to the computer relative to the respective input-output circuits via said respective decoders, and said computer reading the output signals of said input-output circuits by means of said respective address information and diagnosing said input-output circuits.

3. A diagnosing system for a computer control system in which there is a computer and a process, said diagnosing system comprising; an input-output control unit normally coupled between said computer and said process and which transfers a signal from said computer to said process and vice versa, said input-output unit including first switching means normally coupling said process to said unit, said switching means also decoupling said process from said unit in response to a first signal applied to said first switching means, said unit also including second switching means coupled to said first switching means and to said unit, said second switching means normally transferring information from said process via said first switching means to said unit, said second switching means also transferring a second signal to said unit for diagnosing a predetermined portion thereof when said first signal is applied to said first switching means thereby decoupling the process therefrom.

4. The diagnosing system according to claim 3 wherein said first signal originates in said computer.

5. The diagnosing system according to claim 3 wherein said second signal comes from said computer.

6. The diagnosing system according to claim 3 wherein said first switching means comprises an inhibit gate and said second switching means comprises an OR gate in series with the output of said inhibit gate.

* * * * *